United States Patent [19]

Hochstrasser

[11] Patent Number: 5,069,241
[45] Date of Patent: Dec. 3, 1991

[54] CHANGE-OVER VALVE WITH AUTOMATIC RESETTING

[75] Inventor: Ferdinand Hochstrasser, Auenstein, Switzerland

[73] Assignee: KWC AG, Hauptstrasse, Switzerland

[21] Appl. No.: 681,327

[22] Filed: Apr. 5, 1991

[30] Foreign Application Priority Data

Apr. 6, 1990 [CH] Switzerland .................. 01179/90

[51] Int. Cl.⁵ .......................................... F16K 11/044
[52] U.S. Cl. ................................................ 137/119
[58] Field of Search ..................... 137/119, 107, 517

[56] References Cited

U.S. PATENT DOCUMENTS

| | | | |
|---|---|---|---|
| 2,893,416 | 7/1959 | Hegstad | 137/119 |
| 3,656,503 | 4/1972 | Ward | 137/119 X |
| 4,224,962 | 9/1980 | Orszullok | 137/119 X |
| 4,523,607 | 6/1985 | Hutto | 137/107 X |
| 4,606,370 | 8/1986 | Geipel et al. | 137/119 |

FOREIGN PATENT DOCUMENTS

| | | |
|---|---|---|
| 0120318 | 2/1984 | European Pat. Off. . |
| 1396 | 9/1958 | Fed. Rep. of Germany . |
| 2213827 | 10/1972 | Fed. Rep. of Germany . |
| 2455417 | 6/1975 | Fed. Rep. of Germany . |
| 2042129A | 9/1980 | United Kingdom . |

Primary Examiner—Stephen M. Hepperle
Attorney, Agent, or Firm—Barnes & Thornburg

[57] ABSTRACT

Water supplied from a mixing faucet or combination set via an inflow chamber to a change-over valve effects by impact pressure that a double-sided valve member—as a result of an asymmetrical arrangement between a first valve seat and a second valve seat—moves to the first valve seat, thereby blocking the supply to a shower outlet. Therefore, the water is conducted via the second valve seat into a bath-tub outlet. By actuating a draw-button, the double-sided valve member is reversed in order to block the bath-tub outlet and release the shower outlet. Impact pressure now effects self-locking in this position. When the water is turned off and impact pressure no longer prevails, the two-sided valve member thereupon moves into an inoperative positon by the force of two mutually counteracting springs. The conduit leading to the shower is automatically emptied by means of an annular gap remaining between the first valve seat and the double-sided valve member. It is thus precluded that bacteria can multiply or be reproduced in standing water.

12 Claims, 2 Drawing Sheets

CHANGE-OVER VALVE WITH AUTOMATIC RESETTING

BACKGROUND OF THE INVENTION

The present invention broadly relates to mixing faucets or combination sets and, more specifically, pertains to a new and improved construction of a change-over valve with automatic resetting. The present invention also relates to the use of the new and improved change-over valve for fluid flow mixing faucets and the like arranged at bath-tubs.

Generally speaking, the change-over valve with automatic resetting is of the type constructed for the change-over of a flowing medium from a first outlet to a second outlet, the flowing medium being delivered via a supply line or chamber, and comprising a valve member arranged in a housing, which valve member is movable by means of an actuating element between two valve seats associated to the first outlet and the second outlet, respectively. The valve member is held, as the case may be, in one of two end positions co-operating with the respective valve seats when impact pressure effected by the flowing medium prevails. The change-over valve also comprises means for resetting the valve member to an inoperative or neutral position in the absence of the aforesaid impact pressure.

Such a change-over valve with automatic resetting and normally assembled with a bath-tub fluid mixing faucet or combination set is actuatable by means of a draw-button or equivalent structure. In this manner, the fluid or water flow can be changed over or diverted from the bath-tub outlet to the shower outlet, i.e. to the shower. Impact or dynamic pressure generated by the water flow effects self-holding or self-retaining of the change-over valve in the position "shower". Upon interruption of water flow, a re-adjusting or restoring spring provides for automatic re-setting or return to the position "bath-tub".

After using the shower, there remains in the feed or supply line thereof water that can form or produce a medium or culture for pathogenic agents such as, for example, microbes and bacteria. Since it is often a case of warm water and, furthermore, considering that the ambiant temperature in a bathroom ia as a rule relatively high, the reproduction of these pathogenic agents and germs is further promoted.

In connection with the incidence or occurrence of the legionnaires' disease, there has been observed that the causative organism thereof known under the term "legionella pneumophilia" can very strongly multiply in standing water. An infection in connection with this causative organism particularly results from breathing in or inhaling legionella-containing aerosol. Therefore, the danger or risk of infection is especially great or high when taking a shower, since shower bathing promotes the formation of aerosol.

SUMMARY OF THE INVENTION

Therefore, with the foregoing in mind, it is a primary object of the present invention to provide a new and improved construction of a change-over valve which does not exhibit the aforementioned shortcomings of prior art constructions.

Another and more specific object of the present invention aims at providing a new and improved change-over valve with automatic resetting and which precludes growth and reproduction of pathogenic agents and/or germs in water conduits or pipes that are temporarily unused.

Yet a further significant object of the present invention aims at providing a new and improved construction of a change-over valve of the type described which is economical to manufacture, reliable in operation, not readily subject to malfunction and particularly adapted to be used in showering areas and for shower receptors.

Now in order to implement these and still further objects of the invention, which will become more readily apparent as the description proceeds, the change-over valve of the present invention is manifested, among other things, by the features that the means for resetting the valve member to the inoperative or neutral position are adjusted to set the inoperative or neutral position such that the valve member assumes a position arranged in spaced relationship with respect to both valve seats.

The invention is based on the finding as well as realization that the growth and reproduction of pathogenic agents can be practically precluded when temporarily unused water conduits or pipes are kept free of standing water. In the change-over valve constructed according to the invention the two outlets in the inoperative or neutral position of the valve member are open towards each other, so that a higher located conduit or pipe associated to one of the two outlets, for instance a shower conduit or pipe, can be self-actingly emptied or drained via the other outlet whenever the shower has been used.

Self-acting or automatic emptying in sanitary installations for shower stalls is moreover advantageous in that, subsequent to changing over to the position "shower", the person taking a shower immediately receives water of the temperature previously set for the position "bath-tub" instead of—as hitherto the case—at first cold stale water from the shower pipe or shower tube.

A further advantage is seen in the avoidance of long persistent dripping in a leaky change-over valve subsequent to turning off the water supply.

In an advantageous embodiment of the change-over valve constructed according to the invention the inoperative or neutral position of the valve member is located nearer to the valve seat associated to the second outlet than to the valve seat associated to the first outlet. In this manner, there is ensured that the valve member upon water inflow is moved by the impact pressure acting thereupon in the direction of the closer located valve seat. This valve seat should be associated to the shower outlet, in order to self-actingly close the latter such that the water is first conducted into the bath-tub.

The spaced relationship between the valve member positioned in its inoperative or neutral position and the valve seat associated to the second outlet is defined by an annular or ring gap, the width of which is preferably approximately 1 mm.

The valve member advantageously comprises two valve bodies or valve cones mutually arranged on a plunger or equivalent structure. This is an alternative exemplary embodiment of the change-over valve comprising a single double-sidedly operative valve member.

A preferred exemplary embodiment of the change-over valve constructed according to the invention can be achieved in that the resetting means comprise at least one spring. However, it is also possible to effect a resetting with other means, for example, with rubber elements, diaphragms or by other compensating means.

The aforesaid at least one spring can advantageously constitute two springs counteracting relative to each other, whereby there is accomplished a resetting to an inoperative or neutral position defined by a condition of equilibrium between the two counteracting springs.

Apart from a preferred embodiment provided with two counteracting springs constituting two helical pressure or compression springs, it is likewise feasible to provide helical tension springs or also at least one leaf spring in an appropriate arrangement.

The two helical pressure or compression springs of the change-over valve constructed according to the invention possess different spring characteristics. This exemplary embodiment of the resetting means is particularly advantageous in the case of a complementary part for a prior art change-over valve intended for a shower installation, in order to be able to largely use existing components. The stronger spring is thereby the already existing restoring or readjusting spring, which—if used by itself—would close the shower outlet when no impact pressure prevails. The second, weaker spring opposes the stronger first spring, so that the valve member in the pressureless condition keeps open the second valve seat associated to the shower outlet.

Furthermore, there are provided adjusting means for setting the spring characteristic of at least one of the two helical pressure or compression springs. In this manner, it is possible to determine and set the inoperative or neutral position of the valve member, in order to increase the accuracy of resetting or to eliminate tolerances.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENT

Describing now the drawings, it is to be understood that to simplify the showing thereof, only enough of the construction of the exemplary embodiment of the change-over valve with automatic resetting has been illustrated therein as is needed to enable one skilled in the art to readily understand the underlying principles and concepts of this invention.

Figure 1:
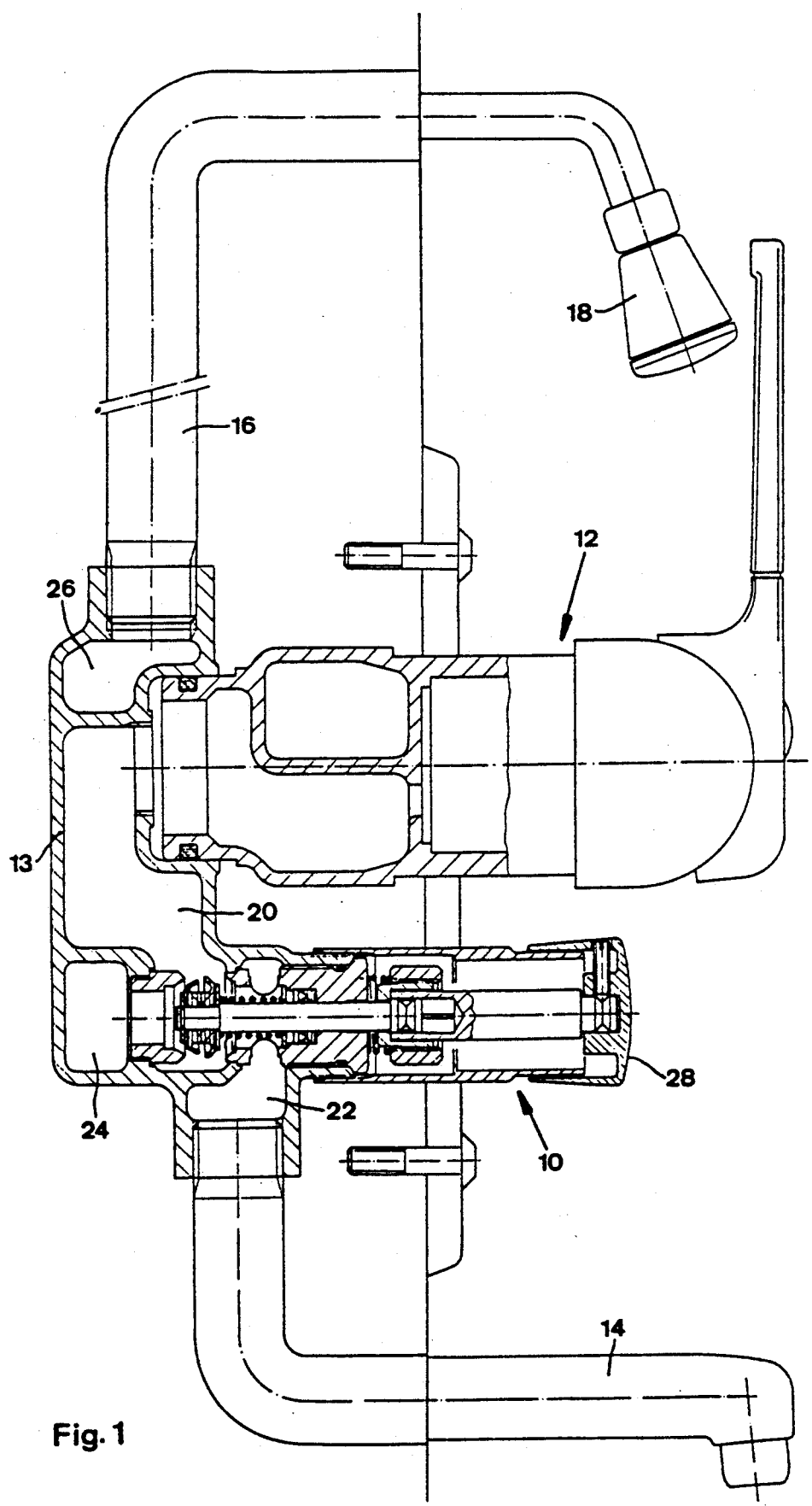
FIG. 1 shows in a side view, partially in section, a fluid flow combination set or mixing faucet assembled with an exemplary embodiment of the change-over valve with automatic resetting constructed according to the invention, particularly for a sanitary installation intended for bath-tubs.

Turning attention now specifically to FIG. 1 of the drawings, a change-over valve 10 illustrated therein by way of example and not limitation will be seen to be assembled with a single-lever combination set or mixing faucet 12 known in the art and accommodated in a housing 13, to which there are connected a bath-tub outflow piece 14 and a shower 18 via a pipe or rigid line 16. A mixed fluid flow of cold water and warm water from the single-lever combination set or mixing faucet 12 is delivered via an inflow or infeed chamber 20 to the change-over valve 10. According to the position of the change-over valve 10, further guidance or routing of the mixed fluid flow is effected either via a first outlet 22 associated to the bath-tub outlet or via a second outlet 24 associated to the shower outlet. This second outlet 24 is connected via a chamber 26 with the pipe or rigid line 16.

Figure 2:
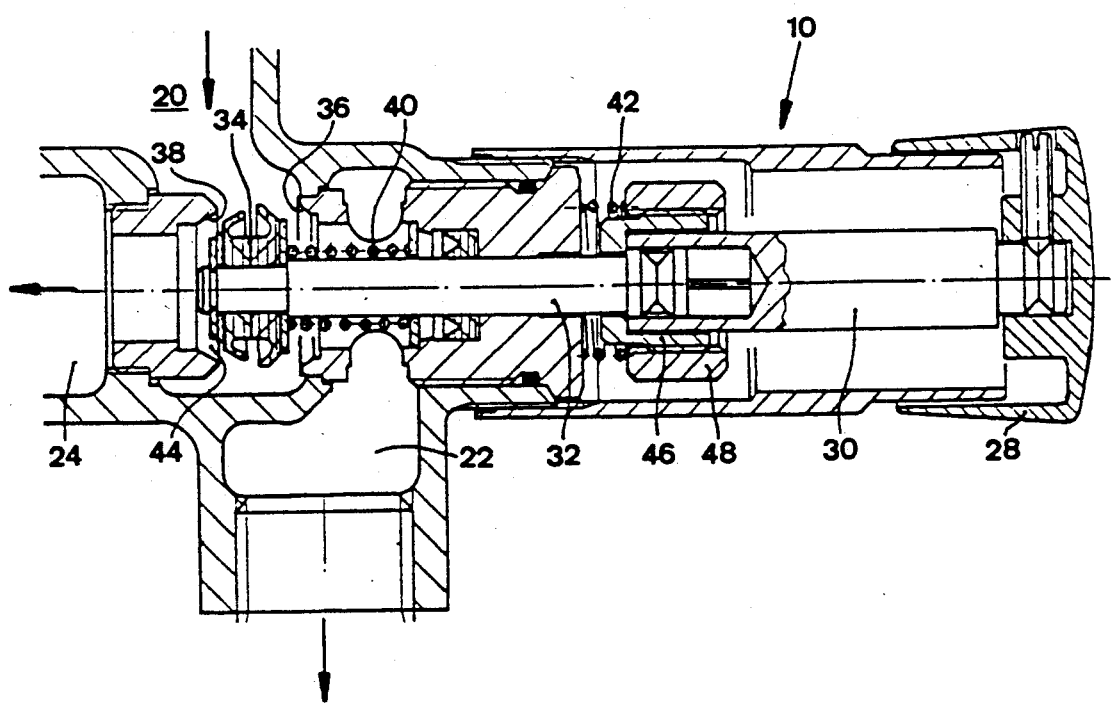
FIG. 2 shows in an enlarged illustration a sectional view of the change-over valve according to FIG. 1.

According to FIG. 2, the change-over valve 10 depicted in FIG. 1 comprises a draw-button 28 or equivalent structure serving as an actuating element. This draw-button 28 is connected to a plunger 32 by means of an extension 30. The plunger 32 supports at its one end a double packing or collar serving as a bilaterally acting valve member 34. Instead of the double packing or collar there can be likewise arranged on the plunger 32 two separate or spaced-apart valve bodies or valve cones.

By co-operating with opposite valve seats 36 and 38 facing each other, the bilaterally acting valve member 34 located in the inflow or infeed chamber 20 can keep free either the throughflow or passage to the first outlet 22 associated to the bath-tub outlet, or the throughflow or passage to the second outlet 24 associated to the shower outlet.

The illustrated position of the valve member 34 corresponds with the inoperative or neutral position which is self-actingly set in the pressureless condition, in other words, when the single-lever combination set or mixing faucet 12 is closed as shown in FIG. 1.

When water is supplied via the inflow or infeed chamber 20 to the change-over valve 10 by opening the single-lever combination set or mixing faucet 12, the impact or dynamic pressure then acting on the bilaterally acting valve member 34 causes the latter to move in the direction of the second valve seat 38 depicted on the left side of FIG. 2, in order to close the second outlet 24 associated to the shower outlet and completely clear the first outlet 22 associated to the bath-tub outlet. In this manner, the position "bath-tub" is set as a starting or initial position.

The one-sidedly directed effect or action of the impact or dynamic pressure results from the one-sided inoperative or neutral position of the bilaterally acting valve member 34, such inoperative position being located nearer to the second valve seat 38 than to the first valve seat 36. This effect can be further promoted by means of a different dimensioning or configuration of the two sides of the bilaterally acting valve member 34. In the exemplary embodiment illustrated in FIG. 2, the side of the valve member 34 facing the second valve seat 38 possesses a larger working surface or face than the opposite side of the valve member 34.

Upon actuation of the draw-button 28, there is accomplished the change-over of water flow from the first outlet 22 associated to the bath-tub outlet to the second outlet 24 associated to the shower outlet. The action of impact pressure changes over to the opposite side of the bilaterally acting valve member 34 and thus effects a self-locking thereof in the position "shower".

Upon closing or shutting off the single-lever combination set or mixing faucet 12, the bilaterally acting valve member 34 again assumes and retains the illustrated inoperative or neutral position as a result of the cessation of impact pressure. This operation is achieved by the actions directed against each other of two coil or helical springs 40 and 42 serving as compression springs. The first coil or helical spring 40 is provided to reset the bilaterally acting valve member 34 in the direction of the second valve seat 38. The spring characteristic of the second coil or helical spring 42 is dimensioned such that it counteracts the first coil or helical spring 40 only inasmuch as the valve member 34 stands off from the second valve seat 38 by approximately 1 mm. A thereby formed annular or ring gap 44 renders possible subsequent to each shower use a self-acting or automatic emptying of the shower line or conduit 24, 26, 16 and 18.

For optimum compensation or adjustment of the spring characteristic, the second coil or helical spring 42 can be set by adjusting means 46 and 48 arranged at the coupling location between the extension 30 and the plunger 32.

While there are shown and described present preferred embodiments of the invention, it is to be understood that the invention is not limited thereto, but may be otherwise embodied and practiced within the scope of the following claims. ACCORDINGLY,

What I claim is:

1. A change-over valve with automatic resetting, for changing over a flowing medium delivered via an inflow supply from a first outlet to a second outlet, comprising:
    a housing;
    a valve member arranged in said housing and having two end positions and an inoperative position;
    an actuating element;
    two valve seats associated to said first and second outlets, respectively;
    said flowing medium causing an impact pressure;
    said valve member being movable by reciprocation of said actuating element between said two valve seats and being held by said impact pressure, as the case may be, in one of said two end positions cooperating with said two valve seats, respectively;
    means for resetting said valve member to said inoperative position in the absence of said impact pressure; and
    said resetting means being adjusted to set said inoperative position such that said valve member assumes a position arranged in spaced relationship with respect to both said valve seats.

2. The change-over valve as defined in claim 1, wherein:
    said inoperative position of said valve member is located closer to said valve seat associated to said second outlet than to said valve seat associated to said first outlet.

3. The change-over valve as defined in claim 2, wherein:
    said spaced relationship between said valve member in said inoperative position thereof and said valve seat associated to said second outlet is defined by a ring gap; and
    said ring gap having a width of approximately 1 mm.

4. The change-over valve as defined in claim 3, further including:
    a plunger;
    said valve member comprising two valve bodies; and
    said two valve bodies being mutually arranged at said plunger.

5. The change-over valve as defined in claim 4, wherein:
    said two valve bodies mutually arranged at said plunger constitute two valve cones.

6. The change-over valve as defined in claim 4, wherein:
    said setting means comprise at least one spring.

7. The change-over valve as defined in claim 6, wherein:
    said at least one spring constitutes two mutually counteracting springs; and
    said two mutually counteracting springs establishing a condition of equilibrium in said inoperative position of said valve member.

8. The change-over valve as defined in claim 7, wherein:
    said two mutually counteracting springs constitute two mutually counteracting helical compression springs.

9. The change-over valve as defined in claim 8, wherein:
    said two mutually counteracting helical compression springs possess different spring characteristics.

10. The change-over valve as defined in claim 9, further including:
    adjusting means; and
    the spring characteristic of at least one of said two mutually counteracting springs being settable by said adjusting means.

11. The use of the change-over valve as defined in claim 1 for a fluid mixing faucet arranged at a bath-tub;
    said first and second outlets constituting a bath-tub outlet and a shower outlet, respectively;
    said flowing medium constituting a water flow; and
    said change-over valve serving to change over said water flow between said bath-tub outlet and said shower outlet.

12. The use of the change-over valve as defined in claim 10 for a fluid mixing faucet arranged at a bath-tub;
    said first and second outlets constituting a bath-tub outlet and a shower outlet, respectively;
    said flowing medium constituting a water flow; and
    said change-over valve serving to change over said water flow between said bath-tub outlet and said shower outlet.

* * * * *